Aug. 29, 1967  R. B. MORSE  3,338,325
ENDLESS TRACK VEHICLE
Filed May 14, 1965  3 Sheets-Sheet 1
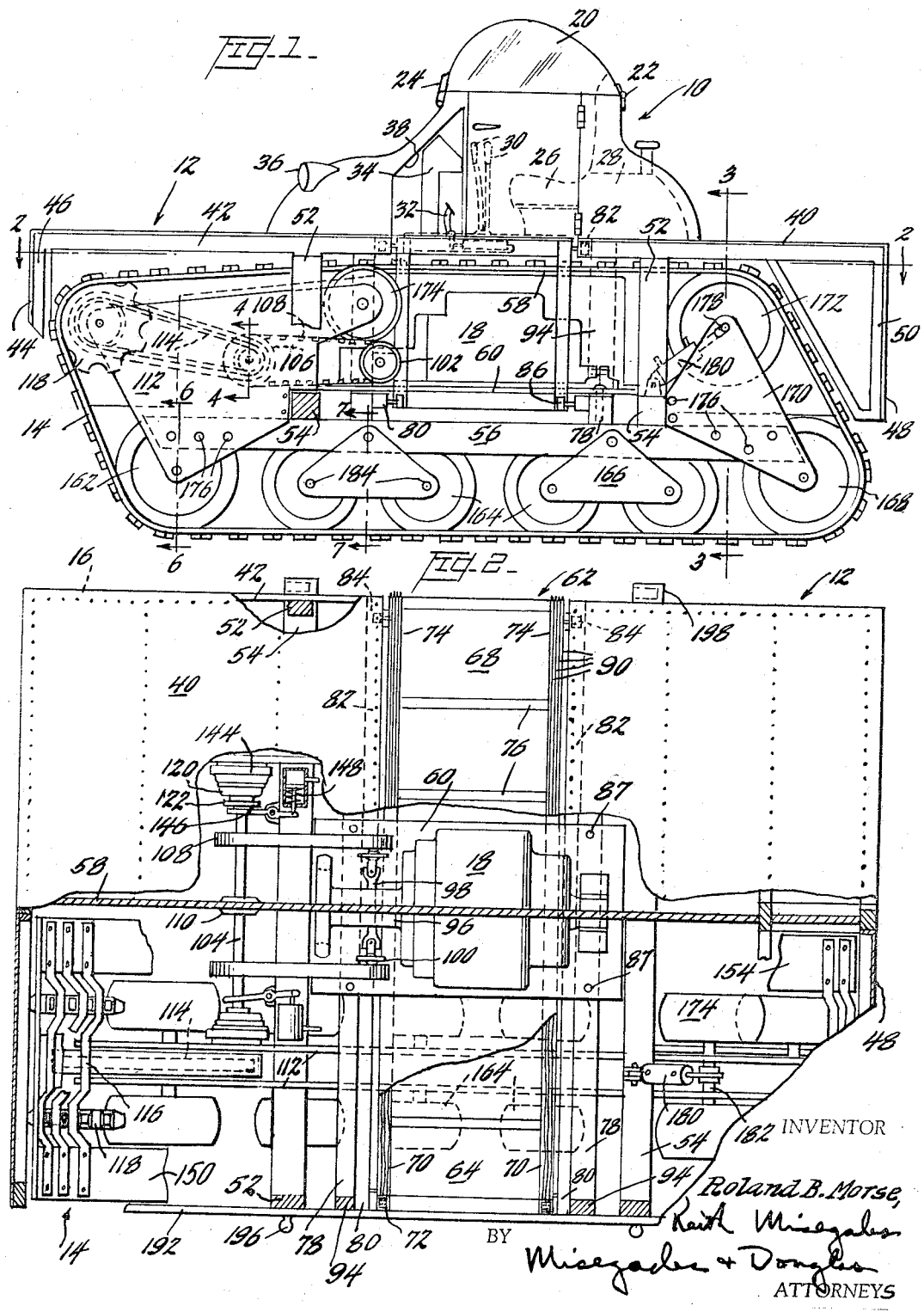
INVENTOR
Roland B. Morse,
BY Keith Misegades
Misegades & Douglas
ATTORNEYS

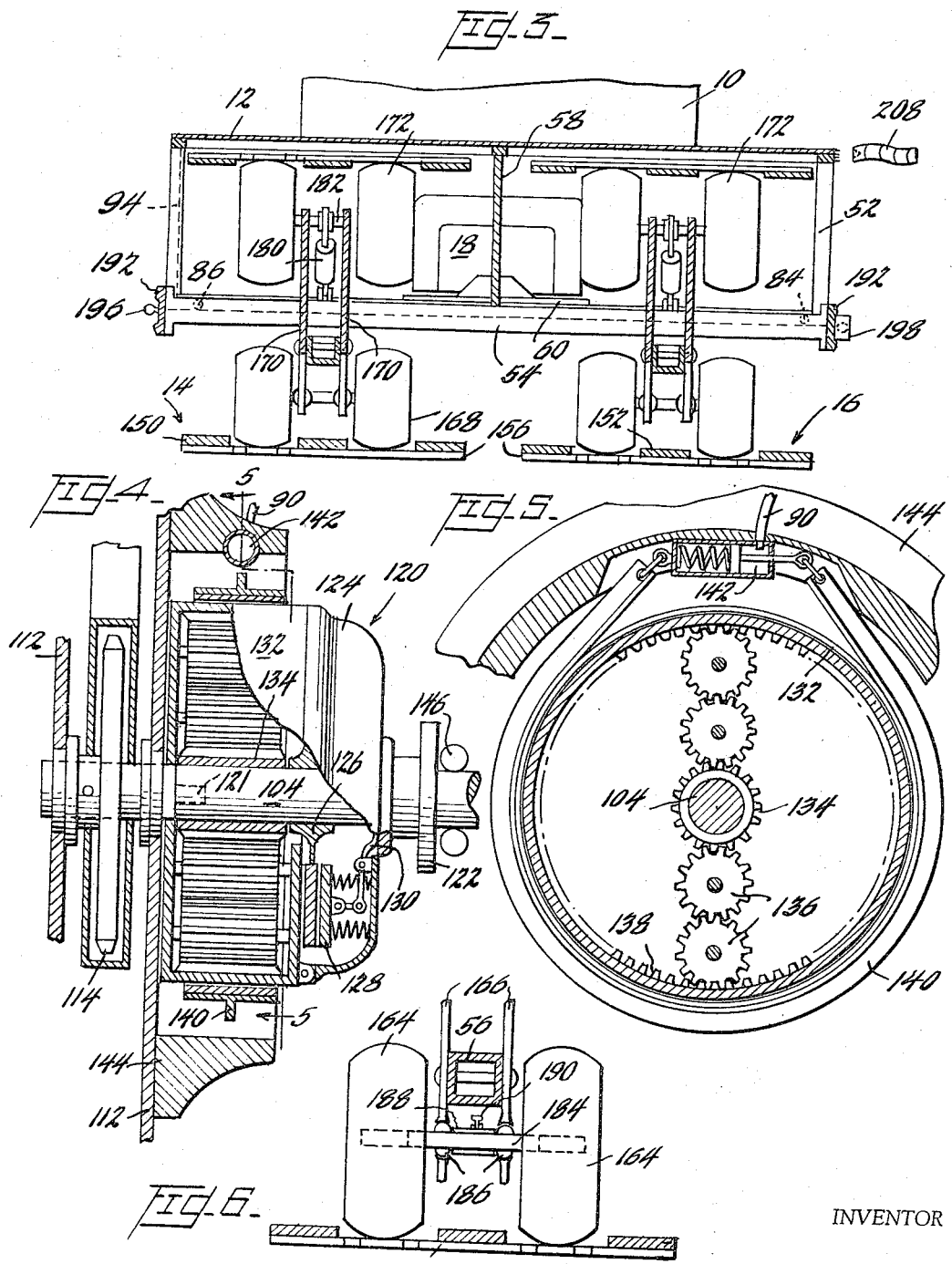

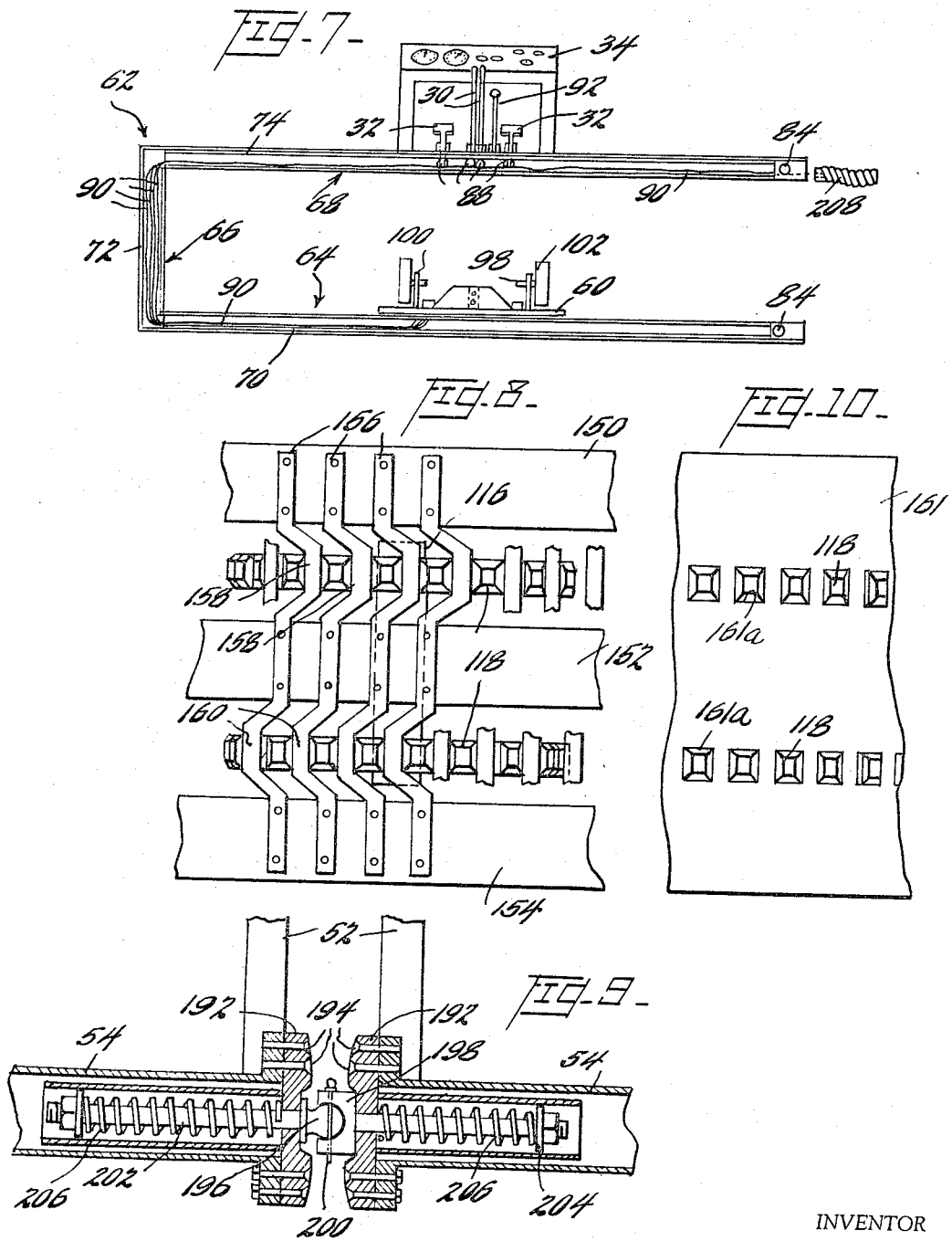

United States Patent Office 3,338,325
Patented Aug. 29, 1967

3,338,325
ENDLESS TRACK VEHICLE
Roland B. Morse, R.F.D., Whitingham, Vt. 05361
Filed May 14, 1965, Ser. No. 455,715
12 Claims. (Cl. 180—6.7)

ABSTRACT OF THE DISCLOSURE

The invention comprises an improved vehicle of the endless track type characterized by plurality of resilient ball and socket connections on either longitudinal side of the vehicle for connection to a similar vehicle so equipped, and by a unique track driving arrangement including a pair of wheels with teeth, and a plurality of track cleats having opposed U-shaped segments so that upward force applied to one segment by one wheel will ensure rigid engagement of the other segment with the other wheel. Other improvements include hydraulic tension jacks for controlling tension in the tracks, track units of a combined width approximating the lateral width of the vehicle, but spaced to allow debris collected thereby to fall therebetween, intermediate, lower wheel sections located interiorly of the track units having articulated supports to allow slight vertical movement of the wheels depending upon surface conditions beneath the vehicle, and a removable frame assembly supporting a power unit for the vehicle, slidable laterally outwardly of the vehicle for servicing of the power unit.

---

This invention refers to self-propelled vehicles and, in particular, to a vehicle of the endless track type.

The invention is especially adapted for use at winter resorts having ski trails. The idea of a winter vacation has always been a popular one in this country. For many years, a number of remote lodges located in mountainous areas of the country have done a booming business during the "season," which runs from November to April. With the development of the sport of skiing, particularly within the last ten or fifteen years, the winter vacation business has literally exploded. A significant factor in the expansion has been the location of new resorts in areas where heretofore it has been considered that the weather is not sufficiently reliable. This and the more intense use of the resorts has made necessary regular management of the skiing facilities instead of relying upon natural conditions for the marking and maintenance of skiing slopes. Today, the well-developed winter resort usually includes anywhere from four to twenty-five or more carefully marked skiing slopes. These slopes or trails are set up dependent upon the varying ability of the skiers at the resort. For example, a beginner's slope may be nothing more than a slight hill fifty or so yards in length, while an expert slope may wind and twist several miles or more through rough country.

Perhaps the best motorized solution to the transportation problem has been the popular "snow-cat." This device comprises a cab powered by an engine driving two endless tracks, and having a pair of skis forwardly of the tracks for guiding the vehicle over snow covered terrain. The "snow-cat" is possessed of two major deficiencies. The first is its relatively high center of gravity, which prevents the vehicle from being used in extremely steep terrain. The second problem is the use of a pair of skis on the forward end of the vehicle. By their very nature, skis are extremely fragile, and can be easily damaged or fractured by hazards such as rocks covered by snow.

Due to the whims of nature, the marking out of ski slopes was not enough; it has become mandatory that the individual ski slope be worked at times with artificial means in order to be consistently useful. One such means is the snow making machine. The artificial snow produced is of the proper consistency for skiing, but it tends to remain loose and powdery. As any experienced skier knows, the best ski trail is formed of a certain amount of hard, packed snow, called "base," and a loose powdery surface of from two to six inches in depth. In order to provide a suitable base, the winter resorts have used tractors and analogous devices pulling rollers behind them. These devices, largely borrowed from the road-making art, are cumbersome and not specifically adapted for working with snow.

The present invention seeks to overcome the problems discussed above by providing a vehicle of the endless track type which may be used for transportation in mountainous, snow-covered country, and which may also be used for preparing skiing slopes for use. The vehicle comprises a frame assembly, a deck seated on the frame, a cab located on top of the deck, two symmetrically placed track units placed beneath the deck, and around the frame, and a removable power plant located centrally with respect to the two track units. These track units taken together have a width almost equal to that of the vehicle itself, thus presenting as large a surface area as possible to contact the riding surface. Desirably, the space between the track units should not be greater than one-fifth the width of a track but should be substantial so as to allow debris collected by the track units to fall therebetween. It thus permits the weight of the vehicle to be distributed over a broad area, thereby preventing the vehicle from becoming bogged down in powdery snow. The central location of the vehicle power plant provides an extremely low center of gravity to the vehicle, thereby permitting its use in very steep terrain. In addition, the wide track surface also allows even and complete compaction of a skiing slope.

The vehicle is possessed of several other distinct advantages. The power plant of the vehicle is specially mounted so as to be easily removed from the vehicle for servicing. Each individual track cleat of the track units is shaped in a novel manner to ensure rigid engagement with the drive means of the vehicle. The deck of the vehicle is shaped at the front and rear end thereof so as to clean the track units of any loose debris as the unit passes therebeneath. Self-cleaning of the track units is further assured by providing a sharp bend in the track by means of the track supporting mechanism. Each track unit is further equipped with hydraulic means for tightening the track or loosening it somewhat, dependent on surface conditions, and the load carried by said vehicle. Support wheels defining the periphery of each track unit are provided, and include lower, intermediate wheel sections including articulated supports to allow slight vertical movement of the wheels depending upon surface conditions beneath the vehicle. Finally, the invention is equipped with detachable connective means along either longitudinal side so as to secure a like vehicle thereto. This permits at least two units to be attached side by side so that a skiing slope of relatively large proportions, such as the expert slope discussed above, can be prepared in a very short period of time.

Further and more complete objects of the present invention may be had by reference to the following specification and drawings in which:

FIG. 1 is a side elevational view of the invention;

FIG. 2 is a top plan view of the invention with parts broken away to show details;

FIG. 3 is a sectional view taken along lines 3—3 of FIG. 1;

FIG. 4 is another sectional view taken along lines

4—4 of FIG. 1, showing the clutch and brake means of the vehicle;

FIG. 5 is an additional sectional view taken along lines 5—5 of FIG. 4;

FIG. 6 is a sectional view taken along lines 6—6 of FIG. 1, illustrating the axle and related structure of one wheel unit;

FIG. 7 is an elevational view of the removable motor platform assembly;

FIG. 8 is an enlarged, partial view of the novel track drive mechanism of the invention;

FIG. 9 is an interior side view drawn to an enlarged scale, of the means used to secure two of the embodiments of the invention together;

FIG. 10 is a view similar to FIG. 8, of a second embodiment of the track drive mechanism.

Referring now to the drawings by reference character, and in particular to FIGS. 1 and 2 thereof, the invention is shown comprising a cab 10, deck 12, independently operable track units 14 and 16, and motor 18. Cab 10 includes an openable transparent canopy 20, hinged at 22 and latched at 24. Interiorly of the cab is a seat 26, fuel tank 28, hand controls 30, foot controls 32, and an instrument panel 34. A pair of headlamps 36 are mounted on the forward end of the cab, and an opening 38 is provided for a removable panel, the function of which will be explained below. Deck 12 includes a top plate portion 40 together with suitable underbracing 42, comprising a suitable lattice work arrangement of tubular support members. At the forward end of deck 12 is a depending plate segment 44 and suitable bracing 46 therebeneath. A second depending plate 48 is mounted at the rear of deck 12 and includes suitable under structure 50. These two depending plates are located adjacent track units 14 and 16 so as to effectively clean the tracks of debris as they pass beneath said plates. The forward plate is operative when the vehicle is in reverse drive, while the rear plate is operable when the vehicle is in forward drive.

The structural frame of the vehicle comprises two pairs of vertical supports 52, 52, secured at the sides of deck support structure 42, a pair of lateral support means 54, 54 welded at the lower ends of vertical supports 52, a pair of longitudinal beam supports 56, 56 rigidly secured beneath lateral means 54, 54, and a central support plate 58 located beneath deck 12 and secured to lateral means 54, 54, so as to provide structural support along the line of symmetry of the vehicle.

Motor 18 is located centrally of the vehicle upon a motor platform 60, and is secured thereto by ordinary motor mounts. In turn, motor platform 60 is rigidly secured to a removable frame assembly 62 comprising bottom panel 64, vertical side panel 66 and top, deck portion panel 68, all rigidly secured together as a unitary assembly. As shown in FIGS. 2 and 7, panel 64 is provided with a pair of longitudinal tubular supports 70, 70, as is panel 66 with supports 72, 72, and top panel 68 with supports 74, 74. Additional structural rigidity is provided for each panel by a number of lateral cross pieces 76. Adjacent beams 54 are a second pair of beams 78, 78, each having a channel member 80 on the inward face thereof. A second pair of channels 82, 82, are formed in the inwardly facing edges of deck member 12 adjacent supports 74, 74. As shown in FIG. 7, the outward faces of supports 70 and 74 are formed as channels, mating with channels 80 and 82 respectively. Each free end of side supports 70 and 74 is provided with a roller 84, adapted to ride in channels 80 and 82, respectively, while the left hand ends of channels 80 and 82 (FIG. 2) are each provided with rollers 86 adapted to ride in the channels formed in supports 70 and 74, respectively. Thus, the sliding action of the removable frame assembly 62 in and out of the vehicle is not unlike that of a file cabinet drawer. Opening 38 permits the instrument panel 34 and foot controls 32 to pass through the side of cab 10. The opening is usually closed by a simple panel (not shown). Assembly 62 is secured in operative position by pairs of drop pins 87 through motor platform 60 and second lateral beams 78, 78.

In addition, hand controls 30 and foot controls 32 are operative through primary master cylinders 88 and a corresponding set of hydraulic lines 90 through supports 70, 72 and 74 to engine 18. Gear shift 92 is operatively secured to engine 18 by a quick-disconnect mechanical coupling through panel 68 (not shown), while gas tank 28 is provided with a quick-disconnect fluid coupling to the carburetor of engine 18 (not shown). The dot and dash lines of FIG. 1 indicate an additional pair of vertical supports 94, inwardly of supports 52, which may be removably secured so as to provide additional structural integrity to the vehicle in the area of removable motor platform assembly 62.

Turning now to FIGS. 1, 2, 4, and 5, the power train of the vehicle will be discussed. In the preferred embodiment of the invention, engine 18 is of the air-cooled pancake variety. Use of this type of engine is extremely desirable in cold, wet climates, as it provides a higher rate of efficiency than the ordinary water-cooled gasoline engine. The engine is secured to its platform by ordinary engine mounts and includes a transmission unit 96 at the forward end thereof. Transmission 96 is of the automatic type and is controlled through a disconnectable, flexible push-pull line by a lever mounted on instrument panel 34 (not shown). Generally speaking, the power train is symmetrical in construction and operation and further provides independent driving power to each track unit 14, 16. Therefor, the present discussion will be devoted to one of the power trains; this is best shown in the lower left quadrant of FIG. 2. One drive shaft 98 having a universal joint therein, extends laterally of the transmission through an axle shaft support 100 to a belt pulley 102. A secondary axle shaft 104 is mounted forwardly of the primary axle and includes a second pulley 106. A detachable positive drive belt 108 is mounted on the two pulleys, and is detached when engine 18 is withdrawn from the vehicle for servicing. Axle 104 is secured in a support bearing 110 in central support plate 58 and in a pair of frame plates 112 secured about beam 56. Between frame plates is an enclosed chain drive 114 which, through appropriate sprockets, transmits power to a tertiary drive shaft 116, which has a pair of sprockets 118 thereon for driving track units 14. Power is transmitted from secondary axle 104 to chain drive 114 through a circumferentially braked, two speed planetary gear transmission unit 120.

Referring now to FIGS. 4 and 5, the operation of planetary drive unit 120 will be explained. Secondary axle 104 is split at 121 to provide two freely rotating portions. A throw-out bearing 122 is secured at the right hand end of axle 104 and abuts against a clutch housing 124. A disc clutch 126 is mounted upon axle 104 and is operable by a spring loaded pressure plate 128. A plurality of connective levers 130 serve to disengage clutch 126 by left hand movement of throw-out bearing 122, with respect to FIG. 4. Clutch 126 is normally biased against a planetary gear housing 132, which is freely rotating with respect to clutch housing 124, but is rigidly mounted upon the secondary portion of axle 104. A sun gear 134, planetary gears 136, and internal gear 138, serve to complete the power train to the secondary portion of axle 104 when clutch 126 is disengaged from planetary gear housing 132. Thus, when clutch 126 is engaged, the two halves of axle 104 will rotate together, thereby transmitting power directly to chain drive 114. When the clutch 126 is disengaged, power will be transmitted through the sun, planetary and internal gear arrangement, to the second half of axle 104, preferably on a two to one ratio, thus reducing the speed of the second half of axle 104 by one half. A brake band 140 is circumferentially secured about the exterior of planetary gear housing 132 and is operable by action of a spring biased, hydraulic cylinder 142. Cylinder 142 is slaved to an appropriate foot pedal 32 through one of the hydraulic lines 90 (FIG. 7). In this manner, the rotation of axle 104 may be stopped entirely. Brake band 140 and hydraulic cylinder 142 are enclosed within a circular brake housing 144, surrounding planetary gear housing 132. FIG. 2 illustrates the operation of throw-out bearing 122. A pivoting, pronged lever 146 is mounted on lateral beam 54 and is operative through a spring-biased, hydraulic cylinder 148. Cylinder 148 is operable by an appropriate hand control 30 through one of the master cylinders 88 and its appropriate hydraulic line 90. It is readily apparent, that through selective use of hand controls 30 and foot controls 32, the speed of one of the track units 14, 16, may be varied with respect to the other track unit so as to steer the vehicle or stop it, as is well known in the art of endless track vehicles.

The remaining features of the power train of the vehicle are best illustrated by FIGS. 2, 3, and 8. The endless track portion of each track unit 14, 16, comprises three endless belts, 150, 152, and 154, secured together by a series of novel cleats 156. As shown in FIG. 8, each cleat 156 has a pair of opposed sprocket engaging portions 158 and 160. This novel construction assures rigid interlocking of each cleat 156 as it passes over, and is propelled by the action of sprockets 118. For example, assume sprockets 118 are being driven towards the left with reference to FIG. 8. This force will act upon the face of one portion 158, thereby tending to move said portion out of engagement with sprocket 118. However, this same action forces corresponding portion 116 downwardly with respect to the other of sprockets 118, thereby assuring rigid engagement of at least one portion 158, 160, with sprockets 118.

A second embodiment of the structure of FIG. 8 is indicated in FIG. 10. In this instance, belts 150, 152 and 154 and cleats 156, are replaced by a single endless belt 161a for engagement with the teeth of sprockets 118, 118. Preferably, belt 161 is made of nylon reinforced rubber conveyor belt material. The use of a single belt permits a smooth surface to be imparted to the snow being impacted by the invention.

The remainder of the endless track is supported by front wheels 162, supported in plates 112, a number of intermediate wheels 164, mounted in support plates 166, a pair of rear wheels 168, mounted in rear support plates 170, adjusting wheels 172, slidably mounted in the upper portion of support plates 170, and a pair of guide wheels 174, mounted in the upper, rear portion of support plates 112, as illustrated in FIG. 1. Each pair of support plates 112, 172, are rigidly secured to the frame structure of the vehicle by a plurality of bolts or rivets 176. Adjusting wheels 172 are adapted for tightening or loosening the endless track portions of track unit 14, 16, by being mounted in a pair of aligned slots 178 of plates 170. A common, hydraulic jack 180 is pivotally secured to frame member 54 and to axle 182 of wheels 172 for controlled movement of the axle in slots 178.

It may be seen from FIG. 1 that the various wheels are so arranged to provide a sharp bend in the endless track in the vicinity of sprockets 118 and rear wheels 168. This construction permits any loose material, such as snow, to be released from the track cleats 156. Any remaining snow or loose material on the track cleats will be effectively cleaned therefrom from overhanging plate portions 44 and 48, respectively.

Intermediate wheels 164 are secured in plates 166 which are attached to longitudinal beams 56 at one point only, thereby allowing limited translational movement between corresponding pairs of plates 166 and wheels 164, dependent upon the surface conditions beneath each track unit 14, 16. This construction is indicated in FIG. 6. Axle 184, for wheels 164, is mounted for free rotation in ball and socket assemblies 186, secured in plates 166. A spacer element 188, including locking screw 190, is used to assure adequate separation of each ball and socket assembly 186.

FIGS. 2, 3, and 9 indicate the means used to join two of the inventions together. Each side of the vehicle is equipped with a removable rub rail 192, secured by removable means, such as bolts 194. Each rail is secured to the terminal ends of lateral beams 54. One rub rail is provided with a pair of balls 196, while the other rub rail is provided with a pair of mating sockets 198, having removable locking pins 200 therein. Behind each ball and socket is a longitudinal shaft 202, having a stop member 204 at the other end thereof. A compressible spring 206 is fitted between each stop 204 and rail 192. To secure two of the vehicles together, it is only necessary to move one alongside the other so that balls 196 slide into sockets 198. Once in place, locking pin 200 may be inserted in socket 198 to secure the vehicles together. The shaft and spring arrangement discussed above permits limited translational movement between the two vehicles, dependent upon the surface terrain over which they travel. It is also possible to operate two vehicles from one vehicle only, by providing a flexible, quick-disconnect hydraulic link 208 for the hydraulic lines 90 of each vehicle.

It can be seen from the foregoing that I have invented a new and useful device in the art of endless track vehicles. Therefore, I am not to be limited to the exact construction provided herein, except as may be within the scope of the following claims.

I claim:

1. A self-propelled vehicle including at least two endless track units of corresponding dimensions, mounted side by side, and spaced apart less than one-fifth the lateral width of one track unit, a power unit for said vehicle being located within the periphery of said track units, support means including a first portion extending transversely within the periphery of the track units and a second portion extending upwardly of the first portion, outside and above said track units, operable control units carried by said support, housed in a cab, and matable means located on the ends of the laterally extending portions of said support for connecting the vehicle to another similar vehicle comprising a plurality of swivable ball and socket connections, said balls located on one side of said vehicle, said sockets located on the opposite side of said vehicle for mating swivable connections to like members located in said similar vehicle, and means for resiliently mounting each of said balls and sockets for limited movement in a direction laterally of said vehicle whereby limited translational movement between said vehicles is allowed in travel over uneven terrain.

2. The device of claim 1 wherein the resilient mounting for each of said balls and sockets comprises a rub rail, mounted on said laterally extending portions, means defining a pair of bores through said rub rail, a pair of shafts for said balls and sockets slidably mounted one through each bore, a pair of coil compression springs, one to each shaft and a pair of stop members, one to the inner terminal end of each shaft securing said spring between the rub rail and the stop member.

3. A self-propelled vehicle including at least two endless track units of corresponding dimensions, mounted side by side, and spaced apart less than one-fifth the lateral width of one track unit, a power unit for said vehicle being located within the periphery of said track units, support means including a first portion extending transversely within the periphery of the track units and a second portion extending upwardly of the first portion, outside and above said track units, operable control units carried by said support, housed in a cab, and separate power take-off and brake means for each track, operable by controls independent of each other, said power take-off means including a primary axle driven from said power unit, a planetary gear mounted on said axle and operable from a control in said cab, a secondary drive axle and means thereon engageable with said track, and chain and sprocket means connecting the planetary gear and the secondary drive axle said track engaging means comprising a pair of wheels having teeth thereon for engaging said track, and a plurality of track elements extending transversely of said track, each element being formed with a pair of rigid, oppositely directed U-shaped segments, for engaging said pair of wheels, one segment immovable with respect to the other segment, so that force applied against said one segment by one of said teeth on one of said wheels will insure engagement of said other segment with one of said teeth on the other of said wheels.

4. The device of claim 3 wherein each of said track elements is formed of a single unit of rigid, cast material, said pair of segments formed coplanar, one with the other.

5. A self-propelled vehicle including at least two endless track units of corresponding dimensions mounted side by side, and spaced apart less than one-fifth the lateral width of one track unit, a power unit for said vehicle being located within the periphery of said track units, support means including a first portion extending transversely within the periphery of the track units and a second portion extending upwardly of the first portion, outside and above said track units, operable control units carried by said support, housed in a cab, matable means located on the ends of the laterally extending portions of said support for connecting the vehicle to another similar vehicle comprising a plurality of swivable ball and socket assemblies, said balls located on one side of the vehicle, said sockets located on the opposite side of the vehicle for mating swivable connection to like members located on said similar vehicle, and means resiliently mounting each of said balls and sockets for limited movement in a direction laterally of said vehicle whereby limited translational movement between said vehicles is allowed in travel over uneven terrain, separate power take-off means for each track from said power unit, each including track engaging means comprising a pair of wheels having teeth for engaging the track and a plurality of track elements, each being formed with a pair of opposed, U-shaped segments, one segment immovable with respect to the other segment.

6. The device of claim 5 wherein each of said track units includes a plurality of pairs of support wheels for the track of said unit, one of said pairs of support wheels adapted for controlled outward movement with respect to said unit, for tensioning said track.

7. The device of claim 5 wherein said track units are substantially spaced apart so as to permit debris collected thereby to be discharged therebetween.

8. The device of claim 5 wherein each of said track units includes a plurality of front, upper, rear and lower, intermediate wheel sections defining the periphery of said endless track, attached to said support means, each of said lower intermediate wheel sections including a pair of plates depending from said support means and pivotally mounted thereon, a pair of axles freely rotatably mounted through said plates and carrying wheels thereon, the mounting of each axle in each plate comprising a ball and socket assembly whereby limited translational movement between said pair of plates is allowed dependent upon surface conditions beneath said track unit.

9. The device of claim 5 wherein said support means further includes a removable frame assembly support, slidable laterally outwardly of said vehicle for servicing of said power unit, comprising a bottom panel, said power unit mounted thereon, a vertical side panel at one end of said bottom panel, and a deck portion panel, said operable control units mounted thereon, and antifriction means interengaging said frame assembly and said support means for limited sliding movement of said assembly.

10. The device of claim 9 wherein said anti-friction means interengaging said frame assembly and said support means comprises mating roller and channel means mounted along the longitudinal side edges of said bottom panel and said deck portion panel, and along the edges of said support means adjacent thereto.

11. In a vehicle including at least two positively driven endless track units of corresponding dimensions, a power unit for positive drive of said track units, and separate power take-off means for each track, track engaging means from said power take-off means to said track comprising a pair of wheels having teeth thereon for engaging said track, and a plurality of track elements extending transversely of said track, each element being formed with a pair of oppositely directed rigid, U-shaped segments for engaging said pair of wheels, one segment immovable with respect to the other segment, so that force applied against one segment by one of said teeth on one of said wheels will insure engagement of said other segment with one of said teeth on the other of said wheels.

12. In a self-propelled vehicle, matable means located along the longitudinal vertical sides thereof for connecting the vehicle to another similar vehicle comprising a plurality of swivelable ball and socket connections, said balls located on one side of said vehicle, said sockets located on the opposite side of said vehicle for mating swivelable connections to like members on the similar vehicle and means resiliently mounting each of said balls and sockets for limited movement in a direction laterally of said vehicle whereby limited translational movement between said vehicles is allowed in travel over uneven terrain.

References Cited

UNITED STATES PATENTS

| | | | |
|---|---|---|---|
| 1,310,604 | 7/1919 | Burgess | 180—14 |
| 1,341,761 | 6/1920 | Putnam | 305—57 |
| 1,854,174 | 4/1932 | Bowman | 280—152 |
| 2,197,248 | 4/1940 | Bonham et al. | 74—720.5 |
| 2,560,613 | 7/1951 | Wahl | 280—512 X |
| 2,899,242 | 8/1959 | Bombardier | 305—38 |
| 2,922,482 | 1/1960 | Fisher | 180—6.2 X |
| 2,990,026 | 6/1961 | Albee | 180—14 X |
| 3,127,190 | 3/1964 | Thesmar | 180—158 X |
| 3,131,781 | 5/1964 | Van Slyke | 180—6.7 |
| 3,198,273 | 8/1965 | Turpen | 180—6.7 |

BENJAMIN HERSH, *Primary Examiner.*

J. A. PEKAR, *Assistant Examiner.*